United States Patent
Kitajima et al.

(10) Patent No.: US 7,116,362 B2
(45) Date of Patent: Oct. 3, 2006

(54) CAMERA AND COMPUTER PROGRAM

(75) Inventors: Tatsutoshi Kitajima, Tokyo (JP); Koichi Sugiura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 582 days.

(21) Appl. No.: 10/230,162

(22) Filed: Aug. 29, 2002

(65) Prior Publication Data
US 2003/0043284 A1 Mar. 6, 2003

(30) Foreign Application Priority Data
Aug. 30, 2001 (JP) .............................. 2001-262488

(51) Int. Cl.
*H04N 5/76* (2006.01)
(52) U.S. Cl. ................................. 348/231.4
(58) Field of Classification Search ............. 348/231.4, 348/231.3, 231.99, 374, 375, 220.1; 396/312, 396/315, 429, 544; 386/95, 96
See application file for complete search history.

(56) References Cited

U.S. PATENT DOCUMENTS

| | | | |
|---|---|---|---|
| 5,109,249 A | 4/1992 | Kitajima | |
| 5,229,805 A | 7/1993 | Kitajima | |
| 5,682,563 A | 10/1997 | Shinohara et al. | |
| 5,748,233 A | 5/1998 | Kitajima et al. | |
| 5,808,681 A | 9/1998 | Kitajima | |
| 5,828,986 A * | 10/1998 | Horigome et al. | 702/126 |
| 5,937,100 A | 8/1999 | Kitajima | |
| 6,075,562 A | 6/2000 | Sakaguchi et al. | |
| 2001/0026263 A1 * | 10/2001 | Kanamori et al. | 345/156 |
| 2002/0021361 A1 | 2/2002 | Kitajima et al. | |
| 2002/0101515 A1 * | 8/2002 | Yoshida et al. | 348/211 |
| 2003/0035055 A1 * | 2/2003 | Baron | 348/231.4 |

FOREIGN PATENT DOCUMENTS

JP 8-293156 5/1996

OTHER PUBLICATIONS

U.S. Appl. No. 10/230,162, filed Aug. 29, 2002, Kitajima et al.
U.S. Appl. No. 10/636,849, filed Aug. 8, 2003, Kitajima et al.
U.S. Appl. No. 10/636,712, filed Aug. 8, 2003, Shinohara et al.
U.S. Appl. No. 10/764,449, filed Jan. 27, 2004, Ojima et al.
U.S. Appl. No. 10/230,162, filed Aug. 29, 2002, Kitajima et al.
U.S. Appl. No. 10/796,022, filed Mar. 10, 2004, Kitajima.
U.S. Appl. No. 10/230,162, filed Aug. 29, 2002, Kitajima et al.
U.S. Appl. No. 10/801,816, filed Mar. 17, 2004, Kitajima.

* cited by examiner

*Primary Examiner*—Tuan Ho
*Assistant Examiner*—Anthony Daniels
(74) *Attorney, Agent, or Firm*—Oblon, Spivak, McClelland, Maier & Neustadt, P.C.

(57) ABSTRACT

In a voice mode, when a shutter button of a camera is fully depressed, first and second switches are turned ON, recording of voice starts. The shutter button is released. When the shutter button is half depressed after the shutter button is released the recording of the voice is stopped. Since the recording of voice is performed between when the shutter button is released and when it is depressed half, no mechanical sound is recorded.

8 Claims, 4 Drawing Sheets

CAMERA AND COMPUTER PROGRAM

BACKGROUND OF THE INVENTION

1) Field of the Invention

The present invention relates to a camera and a computer program. The camera is such that it can record at least voice.

2) Description of the Related Art

The present day digital cameras can record voice and moving images in addition to still images. Almost all the cameras, including the digital cameras, are provided with a shutter button. In digital still cameras, the start and the end of the recording are controlled by operating the shutter button. Generally, the recording is started when the shutter button is pressed once and recording is stopped when the shutter button is pressed once more. In addition, the shutter button is normally coupled with a first switch which starts auto-focusing (AF) and auto-photometry (AE) and a second switch which starts the actual recording. An arrangement is made such that the first switch is turned on when even a weaker force is applied to the shutter button and the second switch is turned on with a force stronger than at which the first switch is turned on.

However, when the shutter button is pressed for recording the voice (or moving images), a mechanical sound produced due to the operation of the second switch disadvantageously gets recorded. Moreover, since the second switch can only be operated when the shutter button is pressed with stronger force, the camera gets a shake.

The problem that the mechanical sound gets recorded can be solved by deleting the data recoded at the end of the recording, when the recording is stopped. However, this technique requires a complicated processing to be performed. As thee data is generally recorded in an external recording medium, a control to read the data, delete and edit the data is required. If moving images are recorded along with the voice, then a control to read the corresponding images, delete or edit the images is also required.

A different technique to solve the problem of mechanical sound disclosed in the Japanese Patent Application Laid-Open No. H8-293156 will be explained here. There are provided a voice collection unit that collects voice, a recording unit that records the voice, and a muffing unit that generates and superimposes a sound that cancels the mechanical sound on the voice collected. Thus, in this technique, the mechanical sound is deleted using a sound generated. However, this technique has a disadvantage that a means that generates the sound that cancels the mechanical sound is required. This increases the cost and also makes the configuration complicated.

SUMMARY OF THE INVENTION

It is an object of the present invention to provide a camera and a computer program both of which realize deletion of the mechanical sound of the shutter button of the camera with a simpler method and configuration.

The camera according to one aspect of the present invention can record a voice. The camera includes an operation button by a first manual operation of which a first function is realized, and by a second manual operation of which a second function is realized, wherein the first manual operation requiring the operation button to be pressed with a first force and the second manual operation requiring the operation button to be pressed with a second force that is stronger than the first force, a voice recording unit which records voice, and a control unit which controls operations of recording voice in accordance with operation of the operation button. The first manual operation of the operation button also realizing stopping of recording of voice.

The camera according to another aspect of the present invention can record a voice. The camera includes a shutter button which turns on a first switch by a first push stroke, and which turns on a second switch by a second push stroke greater than the first push stroke, a mode setting unit which sets a voice mode for recording the voice, a voice recording unit which records an external voice, and a control unit which controls operations of respective sections in accordance with operation of the shutter button. The control unit starts recording the voice by turning on the second switch if the voice mode is set by the mode setting unit, and stops recording the voice if the first switch is turned on again after the first switch and the second switch are turned off.

The camera according to still another aspect of the present invention can record a voice. The camera includes a shutter button which turns on a first switch by a first push stroke, and which turns on a second switch by a second push stroke greater than the first push stroke, a mode setting unit which sets a moving image mode for recording the moving image and the voice, a voice recording unit which records an external voice, and a control unit which controls operations of respective sections in accordance with operation of the shutter button. The control unit executes a photographing preparation operation by turning on the first switch and starts recording the moving image and the voice by turning on the second switch if the moving image mode is set by the mode setting unit, and stops recording the moving image and the voice if the first switch is turned on again after the first switch and the second switch are turned off.

The camera according to still another aspect of the present invention can record a voice. The camera includes an operation button which operates a first function by a first push stroke, and which operates a second function by a second push stroke greater than the first push stroke, a voice recording unit which records an external voice, and a control unit which controls operations of respective sections in accordance with operation of the operation button. A voice recording mute processing start function is included in the first function of the operation button by the first push stroke, and a voice recording stop function is included in the second function of the operation button by the second push stroke.

The camera according to still another aspect of the present invention can record a voice. The camera includes a shutter button which turns on a first switch by a first push stroke, and which turns on a second switch by a second push stroke greater than the first push stroke, a mode setting unit which sets a voice mode for recording the voice, a voice recording unit which records an external voice, and a control unit which controls operations of respective sections in accordance with operation of the shutter button. The control unit starts recording the voice by turning on the second switch if the voice mode is set by the mode setting unit, starts a mute processing if the first switch is turned on again after the first switch and the second switch are turned off, and stops recording the voice if the second switch is turned on.

The camera according to still another aspect of the present invention can record a voice and moving images. The camera includes a shutter button which turns on a first switch by a first push stroke, and which turns on a second switch by a second push stroke greater than the first push stroke, a mode setting unit which sets a moving image mode for recording the moving image and the voice, a voice recording unit which records an external voice, and a control unit which controls operations of respective sections in accordance with operation of the shutter button. The control unit executes a photographing preparation operation by turning on the first switch and starts recording the moving image and the voice by turning on the second switch if the moving image mode is set by the mode setting unit, starts a mute processing if the first switch is turned on again after the first switch and the second switch are turned off, and stops recording the moving image and the voice if the second switch is turned on.

The computer program according to still another aspect of the present invention realizes following steps of a computer. That is, detecting a first manual operation of an operation button by which a first function is realized, and detecting a second manual operation of the operation button by which a second function is realized, wherein the first manual operation requiring the operation button to be pressed with a first force and the second manual operation requiring the operation button to be pressed with a second force that is stronger than the first force, controlling recording of voice based on detection of the first and the second manual operations of the operation button, and stopping recording of voice when the first manual operation of the operation button is detected.

The computer program according to still another aspect of the present invention realizes following steps of a computer. That is, detecting a first manual operation of an operation button by which a first function is realized, and detecting a second manual operation of the operation button by which a second function is realized, wherein the first manual operation requiring the operation button to be pressed with a first force and the second manual operation requiring the operation button to be pressed with a second force that is stronger than the first force, controlling recording of voice based on detection of the first and the second manual operations of the operation button, performing mute processing when the first manual operation of the operation button is detected, and stopping recording of voice when the second manual operation of the operation button is detected.

These and other objects, features and advantages of the present invention are specifically set forth in or will become apparent from the following detailed descriptions of the invention when read in conjunction with the accompanying drawings.

DETAILED DESCRIPTIONS

The embodiments of a (digital) camera and the computer program according to the present invention will be explained in detail below with reference to the accompanying drawings.

Figure 1:
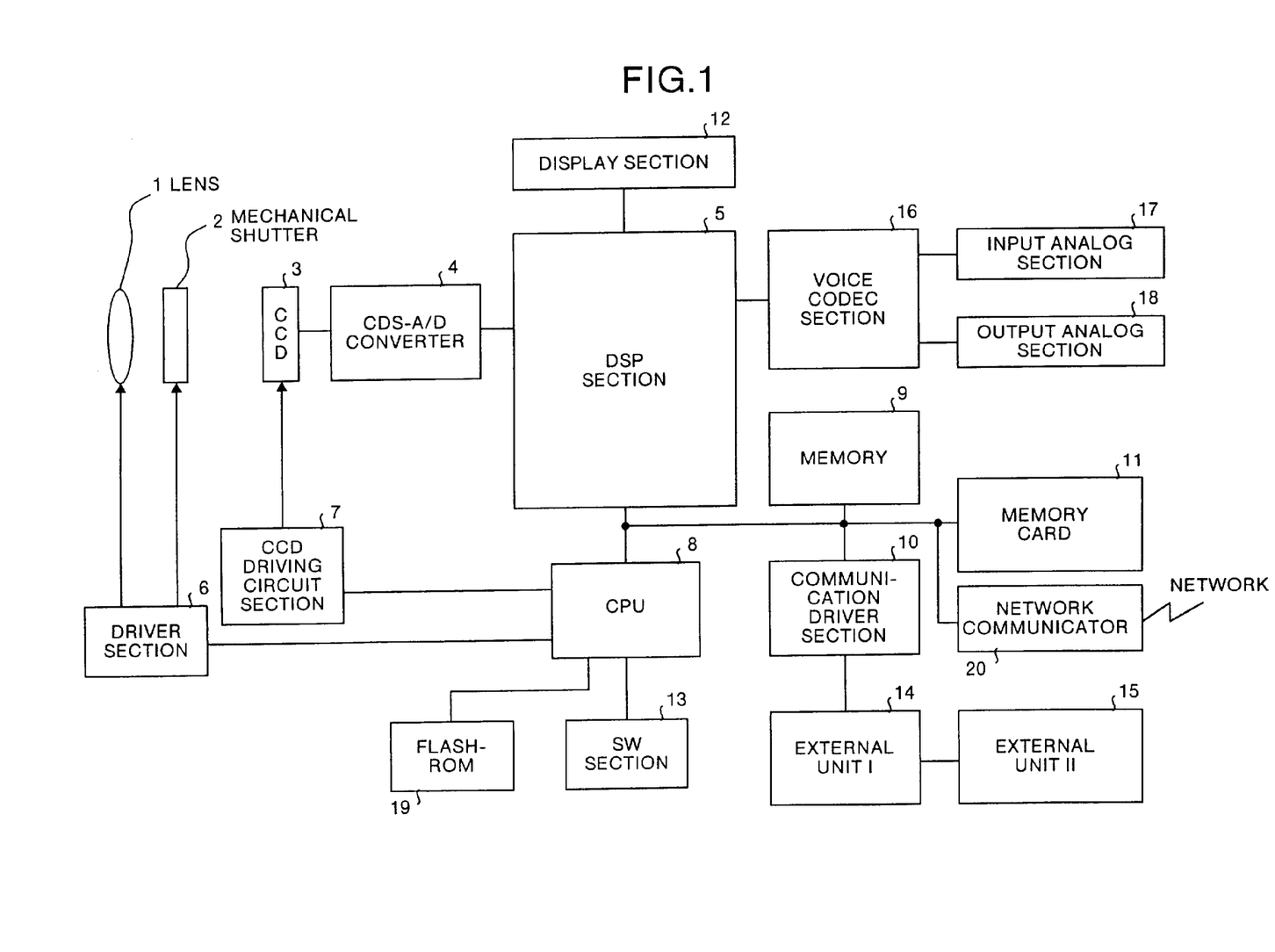
FIG. 1 is a block diagram of the configuration of a digital camera according to a first embodiment of the present invention.

FIG. 1 is a block diagram of the configuration of the digital camera according to the first embodiment. The digital camera shown in FIG. 1 includes a lens 1, a mechanical shutter 2, a CCD 3, a CDS-A/D converter 4, a DSP section 5, a driver section 6, a CCD driving circuit section 7, a CPU 8, a memory 9, a communication driver section 10, a memory card 11, a display section 12, a switch (SW) section 13, an external unit I 14, an external unit II 15, a voice CODEC section 16, an input analog section 17, an output analog section 18, a FLASH-ROM 19, and a network communicator 20.

The lens 1 forms an image of a subject. The CCD 3 converts the image of the subject, which is formed by the lens 1, into an electrical signal and outputs the electrical signal to the CDS-A/D converter 4 as analog image data. The CDS-A/D converter 4 subjects the analog image data, which is input from the CCD3, to relative double sampling, conducts A/D conversion to convert the analog image data into digital image data and outputs the digital image data to the DSP section 5.

The DSP section 5 is a unit which conducts various image processing to the input image data, compresses/expands the image data and voice data. To be specific, the DSP section 5 converts the image data, which is input from the CDS-A/D converter 4, into YUV data (brightness Y data and chrominance U and V data), and compresses the converted YUV data by a compression method according to the JPEG scheme. The DSP section 5 also compresses digital voice data which is input from, for example, the voice CODEC section 16.

The driver section 6 drives the lens 1 and the mechanical shutter 2 in accordance with a control signal which is input from the CPU 8, and drives the focusing of the lens 1 and drives the mechanical shutter 2 to be opened and closed. The CCD driving circuit section 7 drives the CCD 3 based on the control signal which is input from the CPU 8.

The memory 9, which consists of, for example, a DRAM, temporarily stores data on an image which is picked up, voice data which is input, data which is read from the memory card 11 and the like. The memory 9 serves as a work memory of the CPU 8 and the DSP section 5.

The communication driver section 10 holds data communication with the external unit I 14. The external unit II 15 is connectable to the external unit I 14. The network communicator 20 holds data communication with a network.

The memory card 11, which is provided detachably from a digital camera main body, stores image files and voice files. The display section 12 is comprised of a display controller which converts a picture output signal, which is input from the DSP section 5, into a signal which can be displayed on an LCD section and which displays the signal on the LCD section, and the LCD section which displays pictures.

The voice CODEC section 16 converts the analog voice data, which is input from the input analog section 17, into digital voice data and outputs the digital voice data to the DSP section 5. In addition, the voice CODEC section 16 converts digital voice data, which is input from the DSP section 5, into analog voice data and outputs the analog voice data to the output analog section 18. The input analog section 17 inputs external voice and is comprised of a microphone, an amplifier and the like, which convert a voice into voice data which is an electrical signal. The output analog section 18 outputs the voice to the outside of the camera and is comprised of an amplifier and a loudspeaker.

The SW section 13 is comprised of various buttons which are employed for a user to issue various instructions to the digital camera. The SW section 13 is comprised of, for example, a shutter button which instructs start photographing, a mode setting dial which sets various modes, a voice mute button which instructs a mute processing during the recording of a voice, and the like. The mode setting dial sets a still image mode for recording a still image, a moving image mode for recording a moving image and a voice, a voice mode for recording a voice and the like. The shutter button consists of two switches and is constituted to turn on the first SW by half depression (a first push stroke) and turn on the second SW by full depression (a second push stroke). In addition, the shutter button is constituted to turn off the second SW by releasing the full depression and turn off the first SW by releasing the half depression. The shutter buttons have different instruction functions to turn on the first SW and the second SW depending on the respective modes (the still image mode, the moving image mode and the voice mode) as will be explained later in detail.

The CPU 8 controls the operations of the respective sections of the digital camera in accordance with a control program which is stored in the FLASH-ROM 19 based on an instruction from the SW section 13 (SW information). A control program which is stored in the FLASH-ROM 19 can be distributed over the network and can be downloaded through the network to be stored in the FLASH-ROM 19. Further, programs can be written to the FLASH-ROM 19 from the external units I 14 and II 15 which are connected to the FLASH-ROM 19.

The CPU 8 has the still image mode for recording a still image, the moving image mode for recording a moving image and a voice, a voice mode for recording a voice and the like. The CPU 8 controls the execution of the respective modes.

Figure 2:
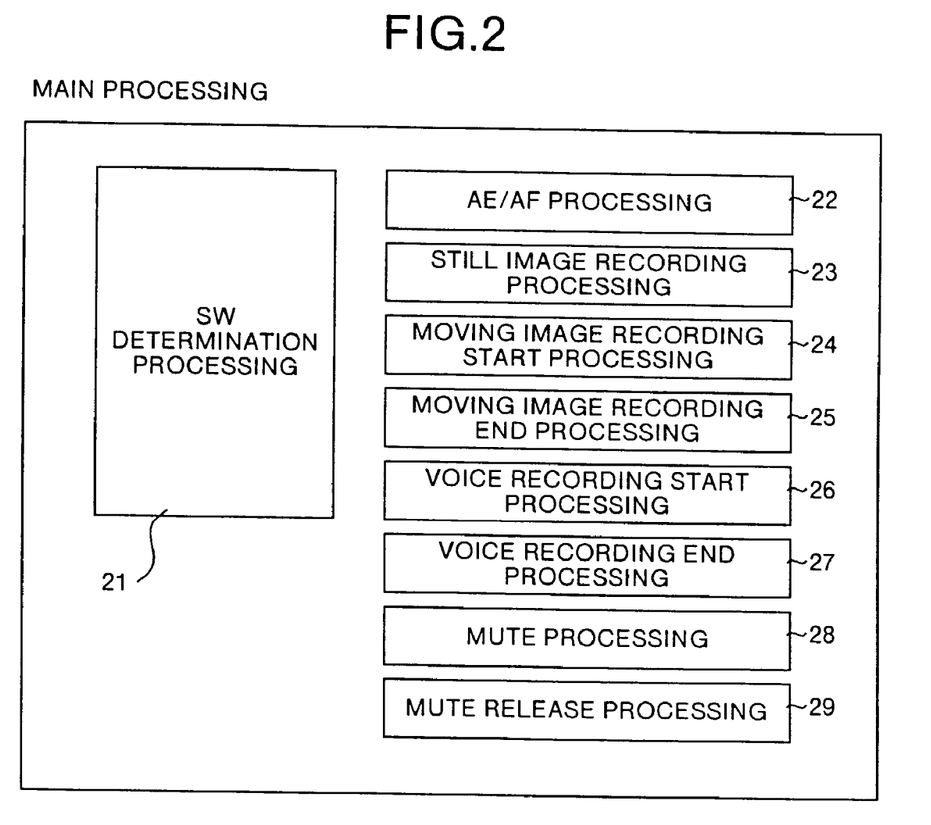
FIG. 2 is a block diagram of a computer program for performing the main processing (main processing blocks) by a CPU shown in FIG. 1.

FIG. 2 is a block diagram of a computer program for performing the main processing (main processing blocks) by the CPU 8. In FIG. 2, an SW determination processing 21 allocates operations to an AE/AF processing block 22, a still image recording processing block 23, a moving image recording start processing block 24, a moving image recording end processing block 25, a voice recording start processing block 26, a voice recording end processing block 27, a mute processing block 28 and a mute release processing block 29, based on the SW information which is input from the SW section 13 by a regular timer interrupt processing at each predetermined timing. The SW determination processing 21 also includes an ON determination processing if a SW is changed from ON to OFF and a processing which disregards the SW if the SW is continuously depressed.

The computer program also includes a moving image recording processing block and a voice recording processing block (not shown) which operate in parallel to the main processing blocks. The moving image recording processing block and the voice recording processing block include a processing for writing data to the memory card 11 and a processing for managing files. The moving image recording processing block and the voice recording processing block are controlled by the moving image recording start/end processing blocks 24 and 25 and the voice recording start/end processing blocks 26 and 27 in the main processing blocks, respectively.

Figure 3:
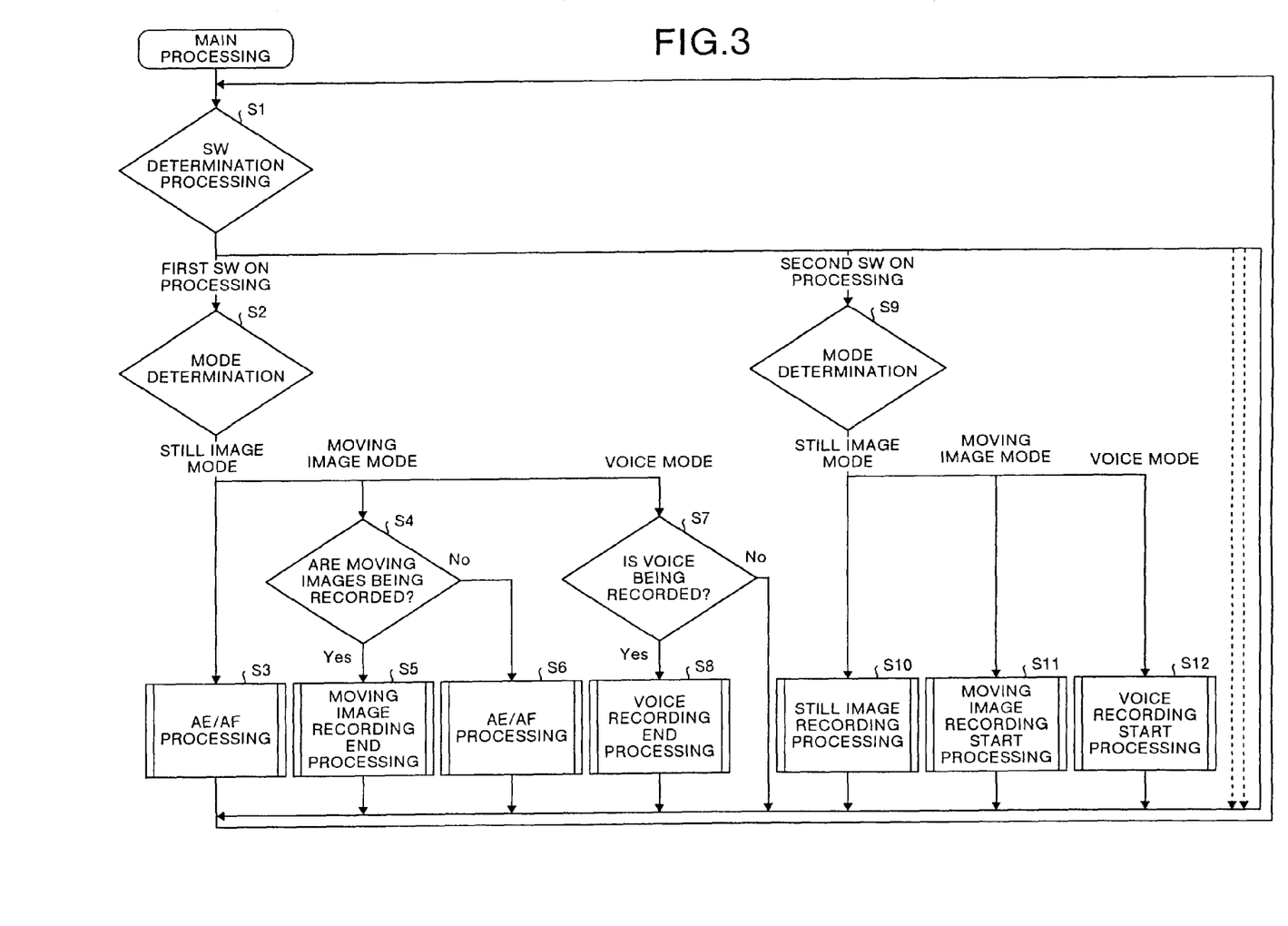
FIG. 3 is a flowchart of the main processing according to the first embodiment.

The main processing of the CPU 8 will be explained next with reference to the flowchart shown in FIG. 3. As shown in FIG. 3, the CPU 8 first conducts an SW determination processing to determine whether the first SW and the second SW of the shutter button of the SW section 13 are turned on (at step S1). If the SW determination result is such that the first SW is turned on, the CPU 8 determines the mode of the digital camera which is set by the mode setting dial of the SW section 13 (at step S2).

If the mode determination result is such that the digital camera is in the still image mode, the CPU 8 conducts an AE/AF processing (at step S3) and then returns to the step S1. If the mode determination result at the step S2 is such that the digital camera is in the moving image mode, the CPU 8 determines whether the moving images are being recorded (at step S4). If moving images are being recorded, the CPU 8 executes a moving image recording end processing (at step S5) and returns to the step S1. If moving images are not being recorded, the CPU8 conducts an AE/AF processing (at step S6) and then returns to the step S1. If the mode determination result at the step S2 is such that the digital camera is in the voice mode, the CPU 8 determines whether voice is being recorded (at step S7). If voice is being recorded, the CPU 8 executes a voice recording end processing (at step S8) and returns to the step S1. If voice is not being recorded, the CPU 8 returns to the step S1.

On the other hand, if the SW determination result at the step S1 is such that the second SW is turned on, the CPU 8 proceeds to step S9 at which the CPU 8 conducts a mode determination. If the mode determination result is such that the digital camera is in the still image mode, the CPU 8 executes a still image recording processing (at step S10) and then returns to the step S1. If it is determined that it is in the moving image mode, the CPU 8 starts a moving image recording processing (at the step S11) and returns to the step S1. If it is determined that it is in the voice mode, the CPU 8 starts a voice recording processing (at step S12) and then returns to the step S1.

The operations of the digital camera in the respective modes ((1) still image mode, (2) moving image mode and (3) voice mode) will next be explained in detail with reference to the flowchart shown in FIG. 3.

(1) Still Image Mode

In the still image mode, if the first SW of the shutter button of the SW section 13 is turned on, the CPU 8 executes an AE/AF processing (at the step S3). Specifically, in this AE/AF processing, the CPU 8 controls the driver section 6 to move the lens 1 and focus the lens 1. In addition, the CPU 8 fetches imaging data through the CCD 3, controls the DSP section 5 to calculate an AE evaluation value based on the fetched imaging data, and determines exposure conditions such as exposure time to be set to the CCD driving circuit section 7.

If the second SW is turned on while the first SW is kept to be turned on, the CPU 8 records still images (at the step S10). Specifically, the DSP section 5 conducts an image processing/compressing processing to the imaging data which is fetched from the CCD 3 and writes the resultant data to the memory 9. The CPU 8 writes the compressed image data which is written to the memory 9, to the memory card 11 as a still image file.

(2) Moving Image Mode

In the moving image mode, if the shutter button of the SW section 13 is half depressed to turn on the first SW, the CPU 8 executes the same AE/AF processing as that in the still image mode (at the step S6). If the shutter button is then fully depressed, i.e., the second SW is turned on while the first SW is kept to be turned on, then the CPU 8 starts a moving image recording processing (at the step S11). Specifically, the DSP section 5 compresses fifteen images, for example, in one second and sequentially writes the compressed images to the memory 9. In parallel to this operation, the DSP section 5 compresses the voice data obtained by inputting analog voice data from the input analog section 17 and converting the analog voice data into digital voice data by the voice CODEC section 16 and sequentially writes the compressed voice data to the memory 9.

The CPU 8 writes the moving images (compressed image data) and the compressed voice data stored in the memory 9 in, for example, one second to the memory card 11 as a one moving image file package. In parallel to this operation, the DSP section 5 writes moving images (compressed image data) and compressed voice data in the next one second to a different area in the memory 9.

If the shutter button is depressed again to turn on the first SW while the moving images are being recorded after the depression of the shutter button is released, i.e., the on states of the second SW and the first SW are released (at the step S5), the moving image recording is stopped. The CPU 8 writes the data in the memory 9 to the memory card 11 and also registers the moving image and voice data which have been written by this time as a file in a file information area in the memory card 11, thereby completing recording the moving image file.

The operation of the shutter button by a user when moving images are recorded will be explained. The user selects the moving image mode by the mode setting dial of the SW section 13. The user fully depresses the shutter button to start recording moving images and then releases the depression of the shutter button. If the user wants to stop recording moving images, the user lightly depresses the shutter button (half depresses the shutter button). By doing so, the moving image recording processing is stopped. Therefore, the user can stop recording moving images only by lightly depressing the shutter button and turn down an operation sound which is recorded when the moving image recording is stopped.

(3) Voice Mode

In the voice mode, if the shutter button of the SW section 13 is fully depressed to turn on the second SW, the CPU 8 starts the voice recording processing (at the step S12). Specifically, the DSP section 5 compresses the voice data obtained by inputting analog voice data from the input analog section 17 and converting the analog voice data into digital voice data by the voice CODEC section 16 and sequentially writes the depressed voice data to the memory 9. The CPU 8 sequentially writes the compressed voice data written to the memory 9, to the card memory 11 as a voice file.

If the shutter button is depressed again to turn on the first SW during the voice recording operation after the depression of the shutter button is released, i.e., the on states of the second SW and first SW are released to turn off the second SW and first SW, then the CPU 8 stops the voice processing (at the step S8). The CPU 8 registers the compressed voice data written to the memory 8 by this time in the file information area in the memory card 11, completing recording the voice file.

The operation of the shutter button by the user when recording voice will now be explained. The user selects the voice mode by the mode setting dial of the SW section 13. The user fully depresses the shutter button to start recording voice and then releases the depression of the shutter button. If the user wants to stop recording the voice, the user lightly depresses the shutter button (half depressed). The voice recording processing is thereby stopped. The user can stop voice recording only by lightly depressing the shutter button and turn down an operation sound which is recorded when stopping the voice processing.

Although not shown in the flowchart of FIG. 3, the CPU 8 conducts a mute processing in accordance with the operation of the voice mute button of the SW section 13 to perform a processing for lowering recording level for recording voice. Specifically, the CPU 8 makes settings of lowering the voice input level by changing over the circuit of the input analog section 17 and lowering the level of the voice data of the DSP section 5. By conducting this mute processing, it is possible to prevent loud sound which is produced during recording or unnecessary sound such as a camera operator's voice from being recorded. The mute processing of the CPU 8 may be conducted while the voice mute button is operated (while the voice mute button is turned on). Alternatively, the mute processing may be started by the first operation of the voice mute button and released by the second operation of the voice mute button. If this mute processing is to be performed, it is possible to decrease the recording of the operation sound by turning on the second SW of the shutter button to stop the voice recording processing.

As explained so far, according to the first embodiment, in the moving image mode, the CPU 8 starts recording moving images and voice if the first SW and second SW of the shutter button are turned on. If the shutter button is half depressed again to turn on the first SW after the on states of the first SW and second SW coupled with the shutter button are released, the CPU 8 ends recording the moving images and the voice. Therefore, only by lightly depressing the shutter button to turn on the first SW, the user can stop recording moving images and voice and turn down an operation sound which is recorded during the recording processing.

According to the first embodiment, in the voice mode, the CPU 8 starts recording voice if the second SW of the shutter button is turned on. If the shutter button is half depressed again after the on states of the first SW and second SW of the shutter button are released, the CPU 8 ends recording the voice. Therefore, only by lightly depressing the shutter button to turn on the first SW, the user can stop recording the voice and turn down an operation sound which is recorded during the recording processing.

A digital camera according to the second embodiment will next be explained. The configuration of a digital camera in the second embodiment is the same as that of the digital camera in the first embodiment (see FIG. 1) Therefore, an explanation about the configuration will be omitted. The digital camera in the second embodiment is such that the shutter button of the SW section 13 has functions of the voice mute button explained in the first embodiment (a mute processing start indication function and a mute processing release indication function).

Figure 4:
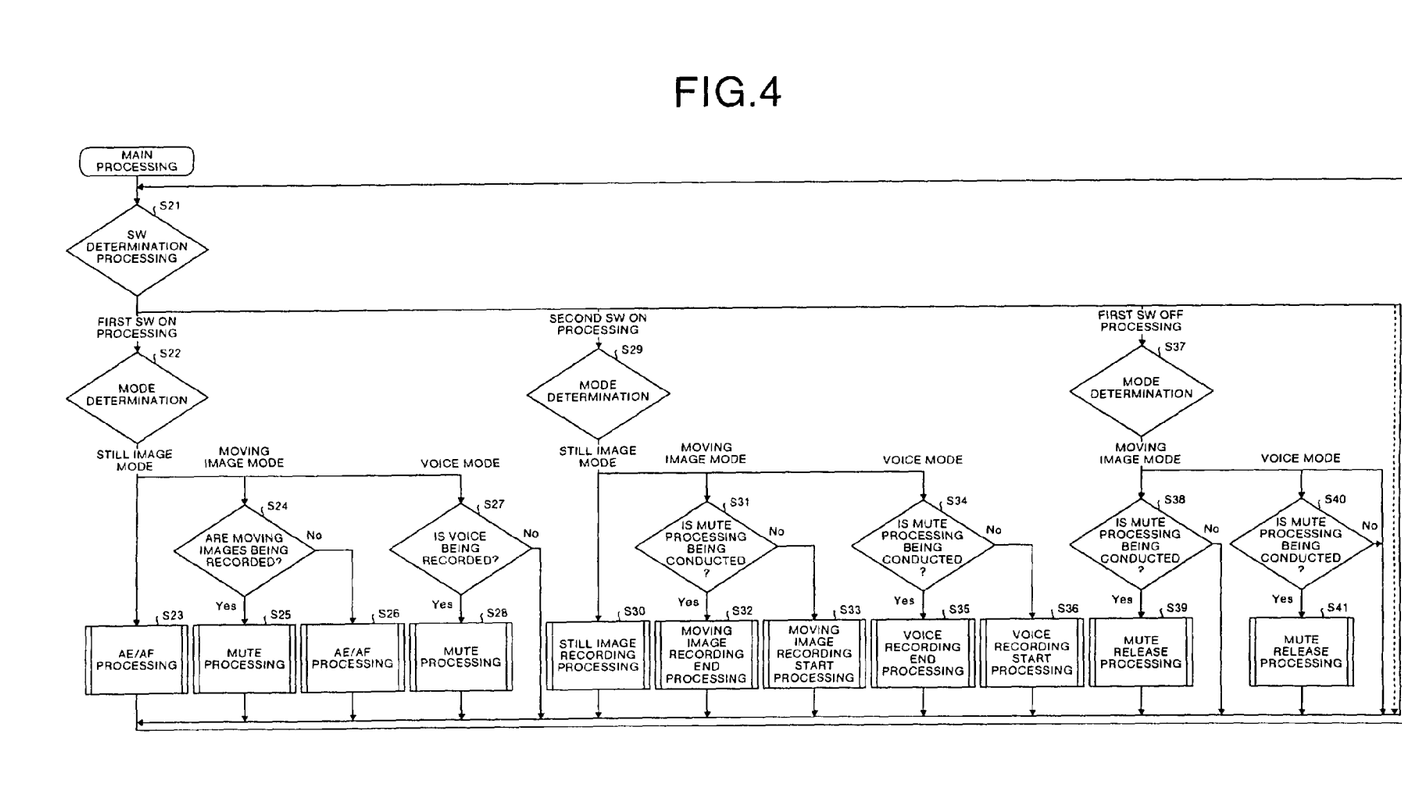
FIG. 4 is a flowchart of the main processing according to the second embodiment.

The main processing of the CPU 8 in the second embodiment will be explained with reference to FIG. 4. FIG. 4 shows a flowchart which explains the main processing of the CPU 8 in the second embodiment. In FIG. 4, the CPU 8 first conducts an SW determination processing to determine whether the first SW and the second SW of the shutter button of the SW section 13 are turned on (at step S21). If the SW determination result is such that the first SW is turned on, the CPU 8 conducts a mode determination (at step S22).

If the mode determination result is such that the digital camera is in the still image mode, the CPU 8 conducts an AE/AF processing (at step S23) and then returns to the step S21. If the mode determination result at the step S22 is such that the digital camera is in the moving image mode, the CPU 8 determines whether the moving images are being recorded (at step S24). If moving images are being recorded, the CPU 8 starts a mute processing (at step S25) and then returns to the step S21. If moving images are not being recorded, the CPU 8 conducts an AE/AF processing (at step S26) and then returns to the step S21. If the mode determination result at the step S22 is such that the digital camera is in the voice mode, the CPU 8 determines whether the voice is being recorded (at step S27). If voice is being recorded, the CPU 8 starts a mute processing (at step S28) and then returns to the step S21. If voice is not being recorded, the CPU 8 directly returns to the step S21.

On the other hand, if the SW determination result at the step S21 is such that the second SW is turned on, the CPU 8 proceeds to step S29 at which the CPU 8 conducts a mode determination. If the mode determination result is such that the digital camera is in the still image mode, the CPU 8 executes a still image recording processing (at step S30) and then returns to the step S21. If mode determination result at the step S21 is such that the digital camera is in the moving image mode, the CPU 8 determines whether a mute processing is conducted (at step S31). If it is determined that the mute processing is conducted, the CPU 8 executes a moving image recording end processing (at step S32) and returns to the step S21. If it is determined that the mute processing is not conducted, the CPU 8 executes a moving image recording start processing (at step S33) and returns to the step S21. If the mode determination result at the step S29 is such that the digital camera is in the voice mode, the CPU 8 determines whether a mute processing is conducted (at step S34). If it is determined that the mute processing is conducted, the CPU 8 executes a voice recording end processing (at step S35) and then returns to the step S21. If it is determined that the mute processing is not conducted, the CPU 8 executes a voice recording start processing (at step S36) and then returns to the step S21.

If the SW determination result at the step S21 is such that the first SW is turned off, the CPU 8 proceeds to step S37 at which the CPU 8 conducts a mode determination. If the mode determination result is such that the digital camera is in the moving image mode, the CPU 8 determines whether a mute processing is conducted (at step S38). If it is determined that the mute processing is conducted, the CPU 8 executes a mute release processing (at step S39) and then returns to the step S21. If it is determined that the mute processing is not conducted, the CPU 8 directly returns to the step S21. If the mode determination result at the step S37 is such that the digital camera is in the voice mode, the CPU 8 determines whether a mute processing is conducted (at step S40). If it is determined that the mute processing is conducted, the CPU 8 executes a mute release processing (at step S41) and then returns to the step S21. If it is determined that the mute processing is not conducted, the CPU 8 returns to the step S21.

The operations of the digital camera in the respective modes ((2) moving image mode and (3) voice mode) will be explained in detail with reference to the flowchart of FIG. 4. The same operations as those in the first embodiment will not be explained in detail. In addition, since the operation in the (1) still image mode is the same as that in the first embodiment, it will not be explained herein.

(2) Moving Image Mode

In the moving image mode, if the shutter button of the SW section 13 is half depressed to turn on the first SW, the CPU 8 executes the same AE/AF processing as that in the still image mode (at the step S26). If the shutter button is then fully depressed, i.e., the second SW is turned on while the first SW is kept to be turned on, then the CPU 8 starts a moving image recording processing (at the step S33).

If the shutter button is half depressed to turn on the first SW after the depression of the shutter button is released, i.e., the on states of the second SW and first SW are released, the CPU 8 starts a mute processing and stores voice in a mute state (at step S25). If this mute processing is started, the CPU 8 continues the mute processing until the mute processing is released.

If the half depression of the shutter button is released to turn off the first SW while the mute processing is being executed, the CPU 8 releases the mute processing and returns voice recording level to an ordinary level (at the step S39). If the shutter button is fully depressed to turn on the second SW while the mute processing is being executed, the CPU 8 stops the moving image recording processing (at the step S32).

The operation of the shutter button by a user when moving images are recorded will now be explained. The user selects the moving image mode by the mode setting dial of the SW section 13. The user fully depresses the shutter button to start recording moving images and then releases the depression of the shutter button. If the user wants to stop recording moving images, the user fully depresses the shutter button. At this moment, the mute processing is started while the shutter button is half depressed. If the shutter button is fully depressed, the moving image recording processing is stopped. Therefore, while the mute processing is being carried out, the moving image recording is stopped and the recording of a sound which is produced when the shutter button is fully depressed is decreased.

(3) Voice Mode

In the voice mode, if the shutter button of the SW section 13 is fully depressed to turn on the second SW, the CPU 8 starts the voice recording processing (at the step S36).

If the shutter button is half depressed to turn on the first SW after the depression of the shutter button is released, i.e., the on states of the second switch SW and the first SW are released, then the CPU 8 starts a mute processing and stores voice in a mute state (at the step S28). If the mute processing is started, the CPU 8 continues the mute processing until the mute processing is released.

If the half depression of the shutter button is released to turn on the first SW while the mute processing is being executed, the CPU 8 releases the mute processing (at the step S41) and returns voice recording level to an ordinary level. If the shutter button is fully depressed to turn on the second SW while the mute processing is being executed, the CPU 8 stops the voice recording processing (at the step S35).

The operation of the shutter button by the user when recording voice will be explained. The user selects the voice mode by the mode setting dial of the SW section 13. The user fully depresses the shutter button to start recording voice and then releases the depression of the shutter button. If the user wants to stop recording the voice, the user fully depresses the shutter button. At this moment, if the mute processing is started while the shutter button is half depressed and the button is fully depressed, the voice recording processing is stopped. Therefore, the voice recording is stopped while the mute processing is being conducted and a sound which is produced when the shutter button is fully depressed is decreased.

As explained so far, according to the second embodiment, in the moving image mode, the CPU 8 starts recording moving images and voice if the first SW and second SW of the shutter button are turned on. If the shutter button is half depressed to turn on the first SW after the on states of the first SW and second SW of the shutter button are released, the CPU 8 starts the mute processing. If the shutter button is fully depressed to turn on the second SW while the first SW is turned on, the CPU 8 stops recording the moving images and voice. Therefore, it is possible to stop recording the moving images and voice while the mute processing is being executed and to turn down an operation sound which is recorded during the recording processing.

According to the second embodiment, in the voice mode, the CPU 8 starts recording voice if the shutter button is fully depressed to turn on the second SW. If the shutter button is half depressed again to turn on the first SW after the on states of the first SW and second SW of the shutter button are released, the CPU 8 starts the mute processing. If the shutter button is fully depressed to turn on the second SW while the first SW is turned on, the CPU 8 ends recording the voice. Therefore, it is possible to stop recording the voice while the mute processing is being executed and to turn down an operation sound which is recorded during the recording processing.

It is noted that the present invention is not limited to these embodiments but can be appropriately changed within the scope of the invention.

The camera according to one aspect includes, an operation button which operates a first function by a first push stroke, and which operates a second function by a second push stroke greater than the first push stroke, a voice recording unit which records an external voice, and a control unit which controls operations of respective sections in accordance with operation of the operation button. In addition, a voice recording stop function is included in the first function of the operation button by the first push stroke. Therefore, it is advantageously possible to provide a camera which can prevent an operation sound of the button which operates stopping of the voice recording, from being recorded as much as possible by a simple control and configuration.

The camera according to another aspect includes, a shutter button which turns on a first SW by a first push stroke, and which turns on a second SW by a second push stroke greater than the first push stroke, a mode setting unit which sets a voice mode for recording the voice, a voice recording unit which records an external voice, and a control unit which controls operations of respective sections in accordance with operation of the shutter button. In addition, the control unit starts recording the voice by turning on the second SW if the voice mode is set by the mode setting unit, and stops recording the voice if the first SW is turned on again after the first SW and the second SW are turned off. Therefore, it is advantageously possible to provide a camera which can prevent an operation sound of the shutter button which operates stopping of the voice recording in a voice mode, from being recorded as much as possible by a simple control and configuration.

The camera according to still another aspect includes, a shutter button which turns on a first SW by a first push stroke, and which turns on a second SW by a second push stroke greater than the first push stroke, a mode setting unit which sets a moving image mode for recording the moving image and the voice, a voice recording unit which records an external voice, and a control unit which controls operations of respective sections in accordance with operation of the shutter button. In addition, the control unit executes a photographing preparation operation by turning on the first SW and starts recording the moving image and the voice by turning on the second SW if the moving image mode is set by the mode setting unit, and stops recording the moving image and the voice if the first SW is turned on again after the first SW and the second SW are turned off. Therefore, it is advantageously possible to provide a camera which can prevent an operation sound of the shutter button which operates stopping of the voice recording in a moving image mode, from being recorded as much as possible by a simple control and configuration.

Moreover, the camera includes a mute button for operating execution of a voice recording mute processing, and the control unit conducts mute processing while the voice is being recorded in accordance with operation of the mute button. Therefore, in addition to the advantage of the invention according to the second and third aspects, it is possible to prevent loud sound or unnecessary sound such as a camera operator's voice from being recorded during the recording processing.

The camera according to still another aspect is a camera which can record a voice. This camera includes an operation button which operates a first function by a first push stroke, and which operates a second function by a second push stroke greater than the first push stroke, a voice recording unit which records an external voice, and a control unit which controls operations of respective sections in accordance with operation of the operation button. In addition, a voice recording mute processing start function is included in the first function of the operation button by the first push stroke, and a voice recording stop function is included in the second function of the operation button by the second push stroke. Therefore, it is advantageously possible to provide a camera which can prevent an operation sound of the button which operates stopping of the voice recording, from being recorded as much as possible.

The camera according to still another aspect is a camera which can record a voice. This camera includes a shutter button which turns on a first SW by a first push stroke, and which turns on a second SW by a second push stroke greater than the first push stroke, a mode setting unit which sets a voice mode for recording the voice, a voice recording unit which records an external voice, and a control unit which controls operations of respective sections in accordance with operation of the shutter button. In addition, the control unit starts recording the voice by turning on the second SW if the voice mode is set by the mode setting unit, starts a mute processing if the first SW is turned on again after the first SW and the second SW are turned off, and stops recording the voice if the second SW is turned on. Therefore, it is advantageously possible to provide a camera which can prevent an operation sound of the shutter button which operates stopping of the voice recording in a voice mode, from being recorded as much as possible by a simple control and configuration.

The camera according to still another aspect is a camera which can record a voice and a moving image. This camera includes a shutter button which turns on a first SW by a first push stroke, and which turns on a second SW by a second push stroke greater than the first push stroke, a mode setting unit which sets a moving image mode for recording the moving image and the voice, a voice recording unit which records an external voice, and a control unit which controls operations of respective sections in accordance with operation of the shutter button. In addition, the control unit executes a photographing preparation operation by turning on the first SW and starts recording the moving image and the voice by turning on the second SW if the moving image mode is set by the mode setting unit, starts a mute processing if the first SW is turned on again after the first SW and the second SW are turned off, and stops recording the moving image and the voice if the second SW is turned on. Therefore, it is advantageously possible to provide a camera which can prevent an operation sound of the shutter button which operates stopping of the voice recording in a moving image mode, from being recorded as much as possible by a simple control and configuration.

The computer program according to still another aspect of the present invention makes a computer execute the steps of detecting an operation content of an operation button which operates a first function by a first push stroke and which operates a second function by a second push stroke greater than the first push stroke, controlling an operation of an apparatus in accordance with operation of the operation button, and controlling voice recording to be stopped if the first function of the operation button is operated by the first push stroke. Therefore, it is advantageously possible to prevent an operation sound of the shutter button which operates stopping of the voice recording from being recorded as much as possible by a simple control and configuration.

The computer program according to still another aspect of the present invention makes a computer execute the steps of detecting an operation content of an operation button which operates a first function by a first push stroke and which operates a second function by a second push stroke greater than the first push stroke, controlling an operation of an apparatus in accordance with operation of the operation button, controlling a voice recording mute processing to be started if the first function of the operation button is operated by the first push stroke, and controlling voice recording to be stopped if the second function is operated by the second push stroke. Therefore, it is advantageously possible to prevent an operation sound of the shutter button which operates stopping of the voice recording, from being recorded as much as possible by a simple control and configuration.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A camera which can record a voice, comprising:
an operation button by a first manual operation of which a first function is realized, and by a second manual operation of which a second function is realized, wherein the first manual operation requiring the operation button to be pressed with a first force and the second manual operation requiring the operation button to be pressed with a second force that is stronger than the first force;
an image recording unit which records images;
a voice recording unit which records the voice; and
a control unit which controls operations of recording the voice and images in accordance with operation of the operation button,
wherein recording of the voice is stopped when only the first manual operation of the operation button is performed, and
recording of images is stopped when the second manual operation of the operation button is performed.

2. A camera which can record a voice, comprising:
a shutter button which turns on a first switch by a first push stroke, and which turns on a second switch by a second push stroke greater than the first push stroke;
a mode setting unit which sets a voice mode for recording the voice;
an image recording unit which records images;
a voice recording unit which records the voice; and
a control unit which controls operations of respective sections in accordance with operation of the shutter button,
wherein the control unit starts recording the voice by turning on the second switch if the voice mode is set by the mode setting unit,
stops recording the voice if only the first switch is turned on again after the first switch and the second switch are turned off, and
stops recording images when the second switch is turned on again after the first switch and the second switch are turned off.

3. The camera according to claim 2, further comprising a mute button for operating execution of a voice recording mute processing, and
the control unit conducts the mute processing while the voice is being recorded in accordance with operation of the mute button.

4. A camera which can record a voice, comprising:
an operation button which operates a first function by a first push stroke, and which operates a second function by a second push stroke greater than the first push stroke;
a voice recording unit which records the voice; and
a control unit which controls operations of respective sections in accordance with operation of the operation button, wherein
a voice recording mute processing start function is included in the first function of the operation button by the first push stroke, and a voice recording stop function is included in the second function of the operation button by the second push stroke.

5. A camera which can record a voice, comprising:
a shutter button which turns on a first switch by a first push stroke, and which turns on a second switch by a second push stroke greater than the first push stroke;
a mode setting unit which sets a voice mode for recording the voice;
a voice recording unit which records the voice; and
a control unit which controls operations of respective sections in accordance with operation of the shutter button, wherein
the control unit starts recording the voice by turning on the second switch if the voice mode is set by the mode setting unit, starts a mute processing if the first switch is turned on again after the first switch and the second switch are turned off, and stops recording the voice if the second switch is turned on.

6. A camera which can record a voice and a moving image, comprising:
a shutter button which turns on a first switch by a, first push stroke, and which turns on a second switch by a second push stroke greater than the first push stroke;
a mode setting unit which sets a moving image mode for recording the moving image and the voice;
a voice recording unit which records the voice; and
a control unit which controls operations of respective sections in accordance with operation of the shutter button, wherein
the control unit executes a photographing preparation operation by turning on the first switch and starts recording the moving image and the voice by turning on the second switch if the moving image mode is set by the mode setting unit, starts a mute processing if the first switch is turned on again after the first switch and the second switch are turned off, and stops recording the moving image and the voice if the second switch is turned on.

7. A recording medium for storing a computer program that realizes a computer to execute:
- detecting a first manual operation of an operation button by which a first function is realized, and detecting a second manual operation of the operation button by which a second function is realized, wherein the first manual operation requiring the operation button to be pressed with a first force and the second manual operation requiring the operation button to be pressed with a second force that is stronger than the first force;
- controlling recording of a voice based on detection of the first and the second manual operations of the operation button;
- stopping recording of the voice when only the first manual operation of the operation button is detected; and
- stopping recording images when the second manual operation of the operation button is detected.

8. A recording medium for storing a computer program that realizes a computer to execute:
- detecting a first manual operation of an operation button by which a first function is realized, and detecting a second manual operation of the operation button by which a second function is realized, wherein the first manual operation requiring the operation button to be pressed with a first force and the second manual operation requiring the operation button to be pressed with a second force that is stronger than the first force;
- controlling recording of a voice based on detection of the first and the second manual operations of the operation button;
- performing mute processing when the first manual operation of the operation button is detected; and
- stopping recording of the voice when the second manual operation of the operation button is detected.

* * * * *